United States Patent [19]
Oouchi et al.

[11] Patent Number: 5,317,563
[45] Date of Patent: May 31, 1994

[54] METHOD OF AND SYSTEM FOR MONITORING PACKET RATE IN PACKET NETWORK

[75] Inventors: Toshiya Oouchi, Kokubunji; Keiko Kuroda, Tokyo; Nobuhiko Ido, Yokohama, all of Japan

[73] Assignee: Hitachi, Ltd., Tokyo, Japan

[21] Appl. No.: 865,051

[22] Filed: Apr. 8, 1992

[30] Foreign Application Priority Data

Apr. 10, 1991 [JP] Japan .................................. 3-077568

[51] Int. Cl.⁵ ...................... H04J 3/14; H04L 12/56; H04L 12/26
[52] U.S. Cl. ....................................... 370/17; 370/60; 370/94.1
[58] Field of Search ................... 370/13, 17, 60, 60.1, 370/94.1, 94.2, 110.1

[56] References Cited

U.S. PATENT DOCUMENTS

| | | | |
|---|---|---|---|
| 5,007,043 | 4/1991 | van den Dool et al. | 370/60 |
| 5,007,048 | 4/1991 | Kowalk | 370/60 |
| 5,050,163 | 9/1991 | Van Bavel et al. | 370/60 |
| 5,119,367 | 6/1992 | Kawakatsu et al. | 370/60 |

FOREIGN PATENT DOCUMENTS 0214625 3/1987 European Pat. Off. .
220531 1/1990 Japan .

OTHER PUBLICATIONS

Computer Networks and ISDN Systems, vol. 20, No. 1/5, Dec. 1990, pp. 415–423, Amsterdam, NL; A. Eckberg et al.: "Brandwidth Management: A Congestion Control Strategy for Broadband Packet Networks—Characterizing the Throughput-Burstiness Filter" Section 2.2, paragraph 2; p. 418.

IEEE Globecom '90, San Diego, Ca., Dec. 2nd–5th, 1990, vol. 1, pp. 1–6, IEEE, New York, U.S.; J. J. Bae et al.: "Survey of Traffic Control Protocols in ATM Networks".

IEEE INFOCOM '89 Ottawa, Ont., Apr. 1989, vol. 2, pp. 701–710, IEEE, New York, U.S.; A. Gersht et al.: "A Congestion Control Framework for ATM Networks".

Patent Abstracts of Japan, vol. 015, No. 121 (E-1049), Mar. 25th, 1991; and JP-A-3 010 543 (Fujitsu) Jan. 18, 1991.

Bala et al., "Congestion Control for High Speed Packet Switched Networks", IEEE, 1990, pp. 520–526.

*Primary Examiner*—Wellington Chin
*Attorney, Agent, or Firm*—Antonelli, Terry, Stout & Kraus

[57] ABSTRACT

In a packet communication network in which a plurality of subscriber's lines are connected with a packet switching unit via a multiplexer and each of terminal units declares the packet rate on call request, a packet rate monitoring circuit is provided between the packet switching unit and the multiplexer. The packet rate monitoring circuit includes a circuit for monitoring the cell arrival rate, a circuit for detecting a packet cell violating the declared value which is transmitted from the terminal, a circuit for adding a mark representative of the violation cell to the violation packet which is detected by the detecting circuit, and a circuit for automatically modifying the declared parameter. The modifying circuit applies the declare parameter which was automatically modified in accordance with utilization condition (the number of multiplexings and the line utilization) of the multiplexer disposed between the subscriber's terminals and the rate monitoring circuit so that the detecting circuit detects the violation packets based upon the modified declared parameter.

16 Claims, 8 Drawing Sheets

METHOD OF AND SYSTEM FOR MONITORING PACKET RATE IN PACKET NETWORK

CROSS-REFERENCE TO RELATED APPLICATION

The present application is related to U.S. patent application Ser. No. entitled "Method of and System for Controlling Packet-Rate in Communication Network" based on Japanese Patent Application No. 3-18588 filed on Feb. 12, 1991.

BACKGROUND OF THE INVENTION

Field of the Invention

The present invention relates to a method of and a system for monitoring input packet rate in a packet network and in particular to a packet rate monitoring method and system for detecting the excessive transmitted packets (violation packets) which violate a contract, i.e., a preliminary agreement made between a subscriber and a network provider (communication network control system) for a communication network using Asynchronous Transfer Mode (ATM).

Description of the Related Art

ATM networks which have been studied in various research institutes as next generation prominent communication systems enable communication of information such as audio, video and data by various media having different transmission rates in the same network by transmitting information in packets having fixed lengths (hereinafter referred to as "cell") at a high rate.

Generally, the capacity of communication provided by a network has a limitation. Accordingly, a network control system (hereinafter referred as a network provider) has the subscriber declare the communication condition such as transmission rate, etc. when the system accepts a call request from the subscriber (terminal unit) and permits the call request when it determines that the passing cell rate will not exceed the communication capacity in the network if the call request is permitted.

However, since the utilization efficiency of resources is enhanced by commonly using resources such as communication nodes and links by a plurality of subscribers, the rate of cells passing through the network may exceed the communication capacity of the network under a circumstance if any of the subscribers transmit the excessive cells which violate his own declared parameter. For example, phenomena such as missing of a part of information or extension of delay time of transmission or switching of information may occur. This will deteriorate the communication quality of the other subscribers which do not violate their own declared parameters.

Therefore, the ATM network requires cell rate monitoring means which detects cells which are transmitted by a subscriber who violates the declared parameter (hereinafter referred to as "violation cells") for regulating the violation cells flowing into the network.

Such a technique for detecting violation packets in a packet communication network has been proposed by, for example, JA-P-A 2-220531 entitled "Call connection control system and rate monitoring system". In this proposed technique, the number of arrival packets within unit time $\Delta t$ is counted and stored for each terminal every time the packets arrive at the network from each terminal. If the count exceeds the parameter (the maximum number m of the transmitted packets in unit time $\Delta t$) which the terminal declared on call request, the system determines that the transmission violets the contract and immediately regulates the arrival packets transmitted from the violation terminal.

In a ATM network, a multiplexer for accommodating a plurality of terminal units may be provided, for example, between the terminal units and a network terminating circuit which is an entrance of the network. In this case, the number of input lines of the multiplexer, the number of output lines of the multiplexer, the transmission speed on the input lines and the transmission speed on the output lines are represented as n (n=1,2,3, . . .), 1, v and kv, respectively. If cells from (k+1) or more terminal units simultaneously arrive at the multiplexer, the number of input cells exceeds the processing capacity of the multiplexer. Some of the arrival cells temporarily stay in a buffer memory in the multiplexer, resulting in delay of cells. This delay time is proportional to the number of cells which simultaneously arrive at the multiplexer.

Since the number of cells which simultaneously arrive at a multiplexer randomly changes, and the delay time correspondingly changes, the intervals between cells which have passed through the multiplexer are different from those between cells which pass through the terminal unit. In other words, a change in cell interval after passing through the multiplexer means a change in the number of arrival cells in unit time $\Delta t$. The change in cell interval depends upon the external condition in which the multiplexer is used. For example, the higher the utilization of the output lines of the multiplexer becomes, or the larger the number of terminal units to be multiplexed in the multiplexer becomes, the larger the change in cell interval becomes.

In accordance with the prior art packet rate monitoring method, every time when cells arrive at a network terminating unit, the number of arrival cells transmitted from a terminal in unit time $\Delta t$ is counted and the arrival cells are regulated as violation cells at the time when the count exceeds the declared parameter (maximum rate m). However, if the above mentioned multiplexer is interposed between terminal units and a network terminating unit which monitors the cell rate and if the intervals between cells inputted to the network terminating unit becomes shorter due to changes in external condition, the number of arrival cells in unit time $\Delta t$ which is monitored by a monitor is larger than the number of cells actually transmitted from the terminal unit. Accordingly, even if the terminal unit keep the declared parameter, the network terminating unit may erroneously determine that the terminal violates the declared parameter. Conversely, when the cell interval becomes longer by the influence of the change in cell interval, the number of cells which arrive at the network terminating unit in unit time $\Delta t$ decreases. Even if the terminal unit violates the declared parameter, the network terminating unit may miss the violation.

It is necessary to control the detection error rate relating to the above mentioned declared parameter violation to sufficiently low in order to assure excellent communication quality. However, since factors which individual terminal units are not responsible for are not considered in accordance with the prior art method, an appropriate cell rate control can not be achieved.

SUMMARY OF THE INVENTION

It is an object of the present invention to provide a method of and a system for monitoring the packet rate which is capable of determining whether or not the rate of cells flowing into a packet network violates the preliminary declared parameter at a high precision.

It is another object of the present invention to provide a packet-rate monitoring method and a monitoring system which can operate at a high precision in a network configuration in which a unit like a multiplexer which is capable of changing the interval of packets on a transmission path is disposed between an network terminating unit for monitoring the packet rate and a terminal unit for transmitting packets.

It is a further object of the invention to provide a packet-rate monitoring method and a monitoring system which is preferable to assure the communication quality of a high speed packet network which treats packets (cells) having fixed lengths.

In order to accomplish the above mentioned object of the present invention, there is provided a packet rate monitoring method for a packet network which determines in accordance with a declared parameter, representative of a packet rate presented from each subscriber terminal unit whether or not a call request is permitted so as to monitor the transmitted packets which violate the declared parameter at a terminating unit of the network. The presented declared parameters are automatically modified in accordance with the condition between the terminal units and the packet network and violation packets are monitored based upon the modified declared parameter.

The packet-rate monitoring system of the present invention is featured in that the network terminating unit is provided with means for automatically modifying the declared parameters of the packet rate declared from subscriber terminals and means for detecting, for each subscriber, violation packets based upon the declared parameters. Modifications of the declared parameters are carried out depending upon the condition between the subscriber terminals and the network terminating unit, in particular upon the condition of factors which change the packet interval in the region therebetween.

One of the packet interval changing factors is, for example, a multiplexer provided between the subscriber terminals and the network terminating unit. The larger the number of subscriber terminals to be multiplexed in the multiplexer becomes, or the higher the output line utilization of the multiplexer becomes, the large value each declared parameter is modified into. A term "modification of the declared parameter" used herein mans that either of unit time which is used for defining the packet arrival rate or the maximum number of the arrival packets from each terminal unit in the unit time (maximum rate m) is changed. The line utilization and the number of subscriber terminals to be multiplexed are determined based upon the number of subscriber terminals which transmit call request and the values of the declared parameters of packet rates which are declared by these subscriber terminals.

In a preferred embodiment of the present invention, the network terminating unit includes a circuit for monitoring the output line utilization of the multiplexer. The declared parameter is modified in consideration of the monitored value of the line utilization. The violation packets which are detected by the above mentioned monitoring are added with given marks representing that these packets are to be regulated and are accepted to the packet network.

In the rate monitoring method and system according to an embodiment of the present invention, the packet rate declared parameters from each subscriber terminal are modified depending upon the packet interval changing factors between the terminals and the network terminating circuit. Since monitoring of the packet arrival rate is carried out based upon the modified declared parameters, the detection error rate of normal cells and violation cells can be lowered in comparison to prior art even if the packet interval is changed due to interposition of a multiplexer. Therefore, the present invention can prevent quality deterioration of normal packet communication which occurs due to a fact that the violation cells use resources which are allocated for the normal packets or due to a fact that the normal cell are regulated as violation cells by detection error. If the monitored value of the output line utilization of the multiplexer is used, an appropriate rate monitoring and packet regulation can be achieved which is capable of responding to momentary change in output line utilization of the multiplexer, which can not be predicted from the number of subscriber terminals which request call and the values of the declared parameters from each subscriber terminal.

The foregoing and other objects, advantages, manner of operation and novel features of the present invention will be understood from the following detailed description when read in conjunction with the accompanying drawings.

DESCRIPTION OF THE PREFERRED EMBODIMENTS

An embodiment of the present invention which is applied to an ATM network will now be described with reference to drawings.

In a communication network using ATM to which the present embodiment is applied, subscribers declare to the network, the transmission rate of cells which they transmit and the network carries out acceptance of calls, allocation of communication resources (bands of communication links and buffers of switching nodes), etc. in accordance with the declared parameters from the subscribers. Accordingly, the subscribers have an obligation to transmit cells within a range of the declared parameters. Since a violation cell will erode the communication resources which are used by normal cells if a violation of the declared parameter occurs, the communication quality of the normal cells will deteriorate. Accordingly, the network detects occurrence of violation of the declared parameter by a rate monitoring circuit and regulates violation calls by a regulation circuit.

Figure 1:
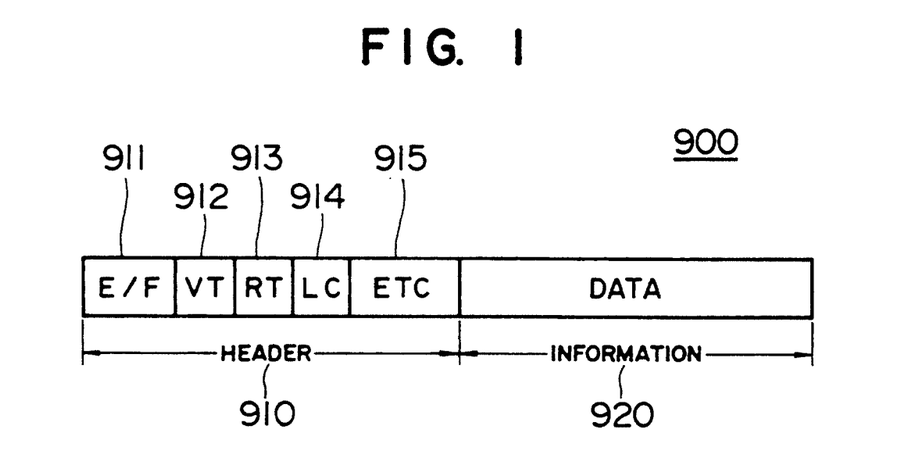
FIG. 1 is a view showing the format of a packet (cell) 901 used in a system of the present invention.

FIG. 1 shows the format of a cell 900 which is used in the present embodiment. The cell 900 comprises a header section 910 and an information section (DATA) 920.

The header section 910 comprises a vacant cell indication field (E/F) 911 which indicates whether the cell is vacant or not, a field (VT) 912 which indicates whether the cell is a violation cell or not, a field (RT) 913 including route information, a field (LC) 914 which indicates a logical channel number and a field 915 which includes the other control information, etc.

The length of the cell 900 in the ATM network is currently standardized to 53 bytes by the CCITT recommendation. The logical channel number (LC) 914 is assigned for each call established between two subscriber terminals. If the parameter of the LC field of the received header is referenced, the subscriber terminal which has transmitted the cell can be known.

Figure 2:
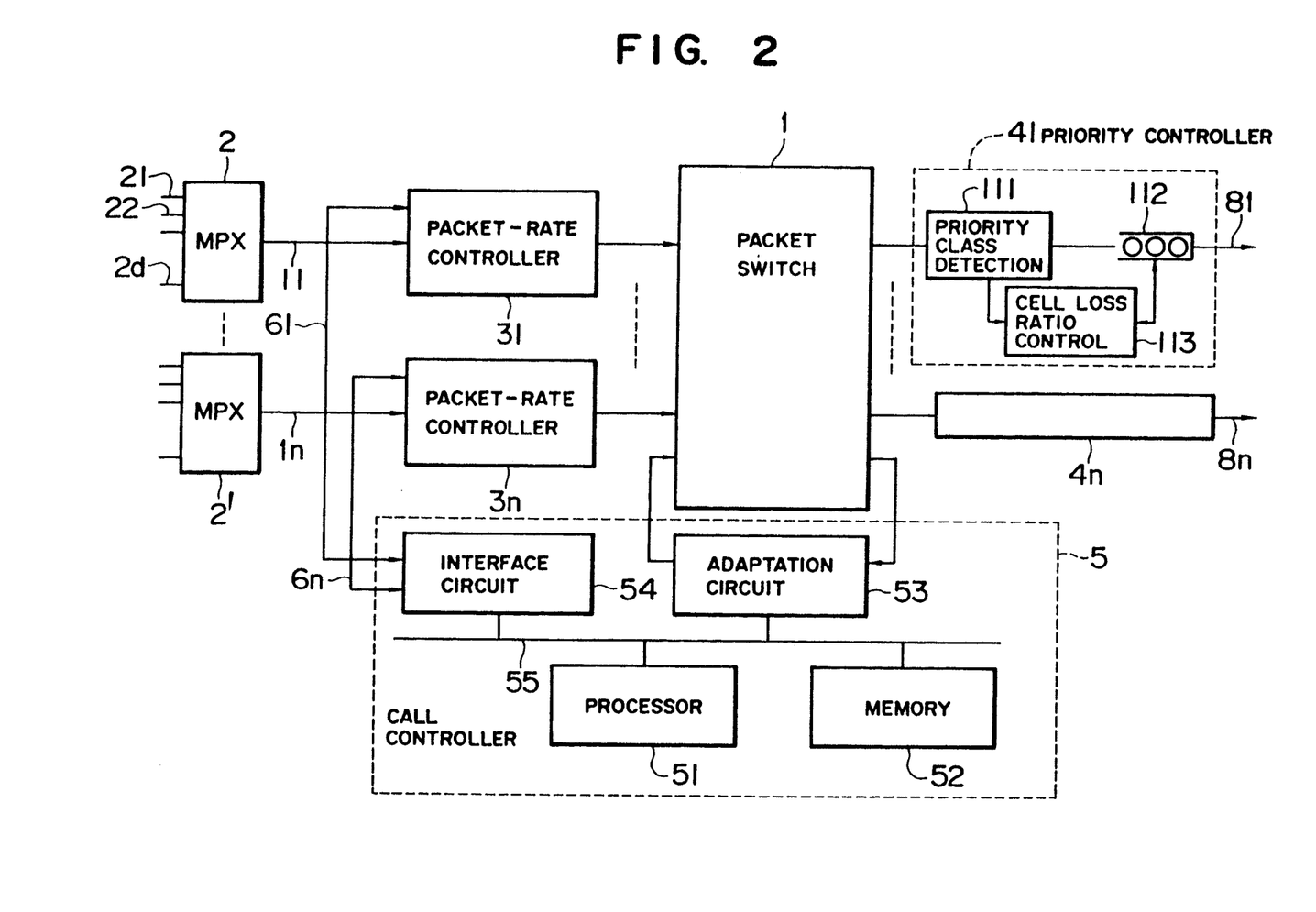
FIG. 2 is a block diagram showing the configuration of a packet switching SYSTEM of the present invention

FIG. 2 is a block diagram showing the configuration of a packet switching system to which the packet-rate monitoring of the present invention is applied. In FIG. 2, a reference numeral 1 denotes a packet switch, 2 (2') a multiplexer which is connected with a plurality of input lines 2l to 2d which are connected with subscriber terminals (not shown); 1i (11 to 1n) an output line of the multiplexer (switch input line of switches); 8i (8l to 8n) an output line of switches; 3i (3l to 3n) a packet-rate controller inserted into a switch input line 1i (1l to 1n); 4i (4l to 4n) a priority controller which is inserted in the switch output line 8i (8l to 8n); 5 a call controller which is connected with the packet switch 1.

The packet-rate controller 3i comprises an arrival packet-rate monitor 10 and a packet regulation circuit 30. Its operation and structure will be hereafter described in detail with reference to FIGS. 3 to 6.

The priority control circuit 4i comprises a priority class detector circuit 111, an output line buffer 112 and a call loss ratio controller 113 which controls input to the output line buffer 112 in accordance with the detection result of the priority class detector circuit 111.

The call controller 5 comprises a data processor 51, a memory 5 which stores control programs which are executed by the data processor 51 and various data, an adaptation circuit 53 which assembles and converts call control cells received from the packet switch 1 into a control message for sending it to the data processor 51 and segments a control message received from the data processor 51 into cells having fixed lengths for transmitting them to the packet switch 1, an interface circuit 54 (multiplexing/demultiplexing circuit ) 54 which is connected with each of the packet control circuits 3i (3l to 3n) through control lines 6i (6l to 6n) and a bus 55 which connects these components with each other.

The call controller 5 has a function to preset various parameters which the packet-rate controllers 31 to 3n require and a function to issue a communication terminating instruction to an abnormal terminal.

Each subscriber terminal declares a value of the transmission rate of cells (declared parameter) for each logical channel number prior to communication. A message representative of the declared parameter is transmitted to the packet switch 1 as a control packet through the input line 1j and the packet-rate controller 3j with which the subscriber terminal is connected and inputted to the adaptation circuit 53 by the packet switch 1. When the data processor 51 of the call controller 5 receives the declared parameter from the adaptation circuit 53, the processor 51 determines first to third threshold values used for monitoring packet-rate in accordance with the declared parameter and presets them in the relevant packet-rate controller 3j through the control signal line 6. A message to the subscriber terminal or the other switch which is generated by the data processor is given to the adaptation circuit 53 and segmented to one or a plurality of cells having fixed lengths and the cell or cells are outputted to the output line 8j to a destination unit through the packet switch 1.

Figure 3:
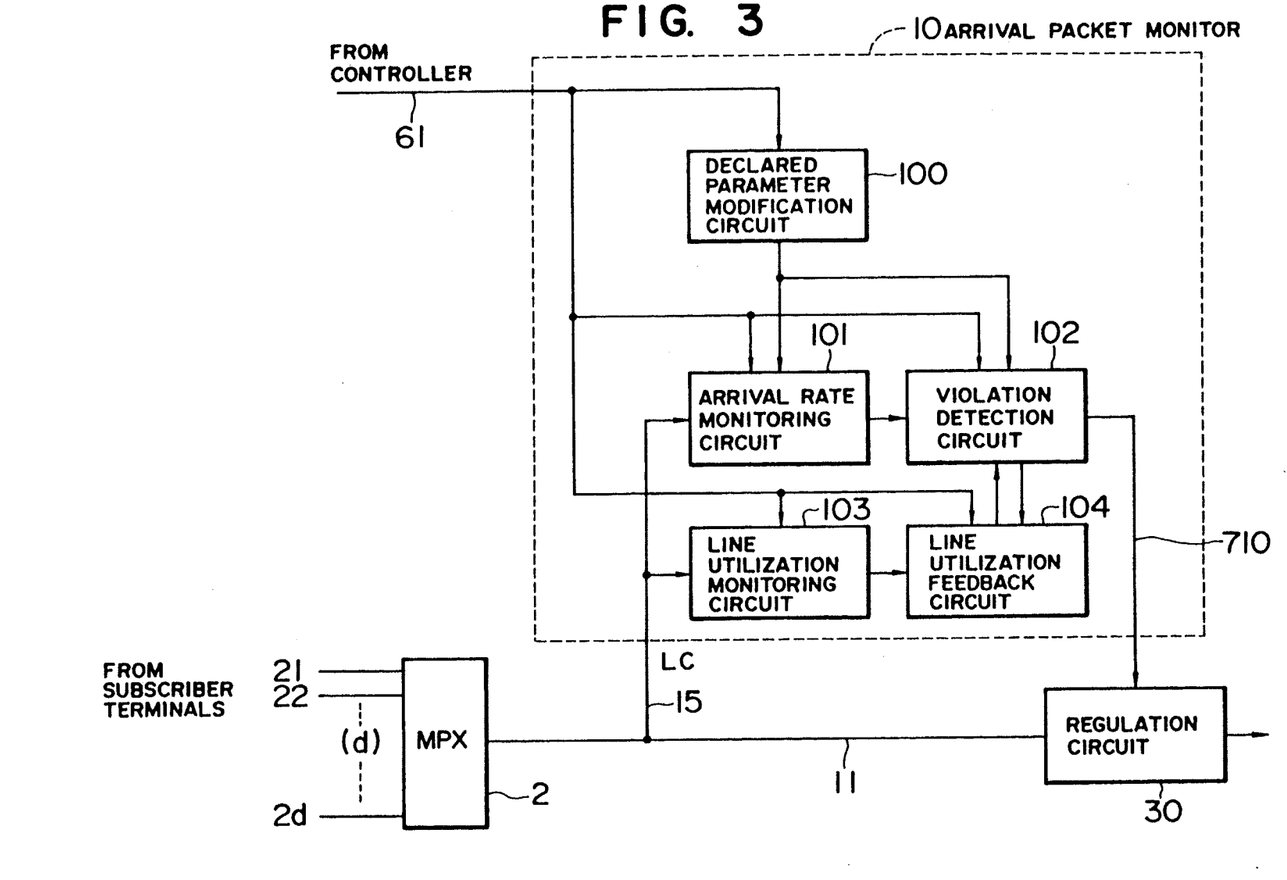
FIG. 3 is a block diagram showing an embodiment of a rate monitoring system of the present invention.

FIG. 3 shows a structure of the packet-rate control circuit 31 including the packet-rate monitoring circuit 10 of the present invention. In the drawing, reference 10 denotes the packet-rate monitoring circuit; 2 a multiplexer (MPX) which is connected with subscriber terminal via the plurality of input lines 2l to 2d; and 30 a regulation circuit for regulating violation cells. The packet-rate monitoring circuit 10 comprises a declared parameter modification circuit 100; a packet arrival rate monitoring circuit 101; a violation detection circuit 102; a line utilization monitoring circuit 103; and a line utilization feedback circuit 104 and is provided at the entrance of the ATM network such as a subscriber switch.

Even when the multiplexer 2 is provided between a subscriber terminal and the packet rate monitoring circuit 10, violation cell detection can be properly carried out by the modification of each declared parameter by means of the declared parameter modification circuit 100 depending upon the utilization condition of the multiplexer 2 in the present embodiment, although such detection could not be otherwise carried out in the prior art.

The multiplexer 2 may be provided in the network or a multiplexer (for example, NT2) which exists outside of the network. The format of the multiplexing is not particularly limited. However, the multiplexer 2 should include memory means (buffer memory) which can temporarily store cells. In the present embodiment, the utilization condition of the multiplexer 2 is determined by the number of the subscriber terminals which are accommodated by the multiplexer 2, the declared parameter from each of subscribers and the output of the line utilization monitoring circuit 103

In FIG. 3, after a cell which is fed out to the input lines 2l to 2d from each subscriber terminal is multiplexed by the multiplexer 2, it will be fed to the network (the ATM switch in this embodiment) via the line 11. The arrival rate monitoring circuit 101 monitors the arrival rate (n) of arrival cells for each logical channel number (LC) 914 every time when the cell arrives. When the monitored value of the arrival rate (n) exceeds the threshold value Nth which is preliminarily preset for each logical channel number, the violation detection circuit 102 determines that a violation cell has arrived and provides a control signal to the regulation circuit 3 for regulating the violation cell.

Each subscriber declares the cell transmission rate of his own terminal to the network (call controller 5) by using parameters which are values of time interval T and the maximum number X of the transmitted cells within the time interval T on call request. If no fluctuation of the cell arrival rate occurs, the multiplexer 2 makes the values of the monitoring period of time of the arrival rate (Tm) used in the arrival rate monitoring circuit 101 and the threshold (Nth) used for detecting violation in the violation detection circuit 102 equal to those of the declared parameter as shown in equations (1) and (2) and when the number of arrival cells within the time interval T exceeds X, the multiplexer determines that the cells which subsequently arrive are violation cells.

$$\text{monitoring time interval } Tm = T \quad (1)$$

$$\text{violation detection threshold } Nth = X \quad (2)$$

Since the number of cells generally exceeds the processing capacity of the multiplexer 2 if cells simultaneously arrive at the multiplexer 2 from a number of input lines, some of the cells are temporarily waited in the memory means in the multiplexer 2. In other words, even if a terminal transmits cells at a predetermined rate, the arrival rate of the cells to the ATM network is changed by the interposition of the multiplexer 2 therebetween. The change in the cell rate is hereafter referred to as "fluctuation ($\Delta X$)" and is defined as follows:

$$\Delta X = \text{(The number of cells which arrive at the multiplexer within the time interval T)} - \text{(the number of cells which are outputted from the multiplexer within the time interval T)}$$

Therefore, when the values of the monitoring time interval (T) and the threshold (Nth) are preset equal to the declared parameter and $-\Delta X$ is large, the violation detection circuit 102 may misrecognize that a violation cell occurs even if a user transmits cells within the declared parameter to lines 2l to 2d. Conversely, when $\Delta X$ is large, the violation detection circuit 102 may miss the violation cells even if a user transmits excessive cells exceeding the declared parameter to the lines 2l to 2d.

If such detection error of normal or violation cells occurs, the communication quality of normal cells may deteriorate due to a fact that missed violation cells use resources which are to be assigned for the normal cells or a fact that the normal cells are regulated as violation cell by misrecognition.

The cell which the user transmits within or over the declared parameter will hereinafter referred to as "normal cell" or "violation cells", respectively.

In the present embodiment, in order to suppress the detection error rate within a proper range, the declared parameter which is declared by the subscriber is converted (modified) by the declared parameter modification circuit 100. T'(time interval) and X'(the maximum of the number of transmitted cells within the time interval T) representative of the modified declared parameter are as follows:

$$T' = k \cdot T \quad (k = 1, 2, 3, \ldots)$$
$$X' = K \cdot k \cdot X \quad (K \geq 1, K: \text{real number})$$

wherein K is a parameter for controlling the detection error rate of normal cells and k is a parameter for controlling the detection error rate of violation cells.

The monitoring time interval (Tm) and the violation detection threshold (Nth) are determined in accordance with the declared parameter which has been modified as follows:

$$\text{The monitoring time interval } Tm = T' \quad (1')$$

$$\text{The violation detection threshold } Nth = X' \quad (2')$$

Figure 7:
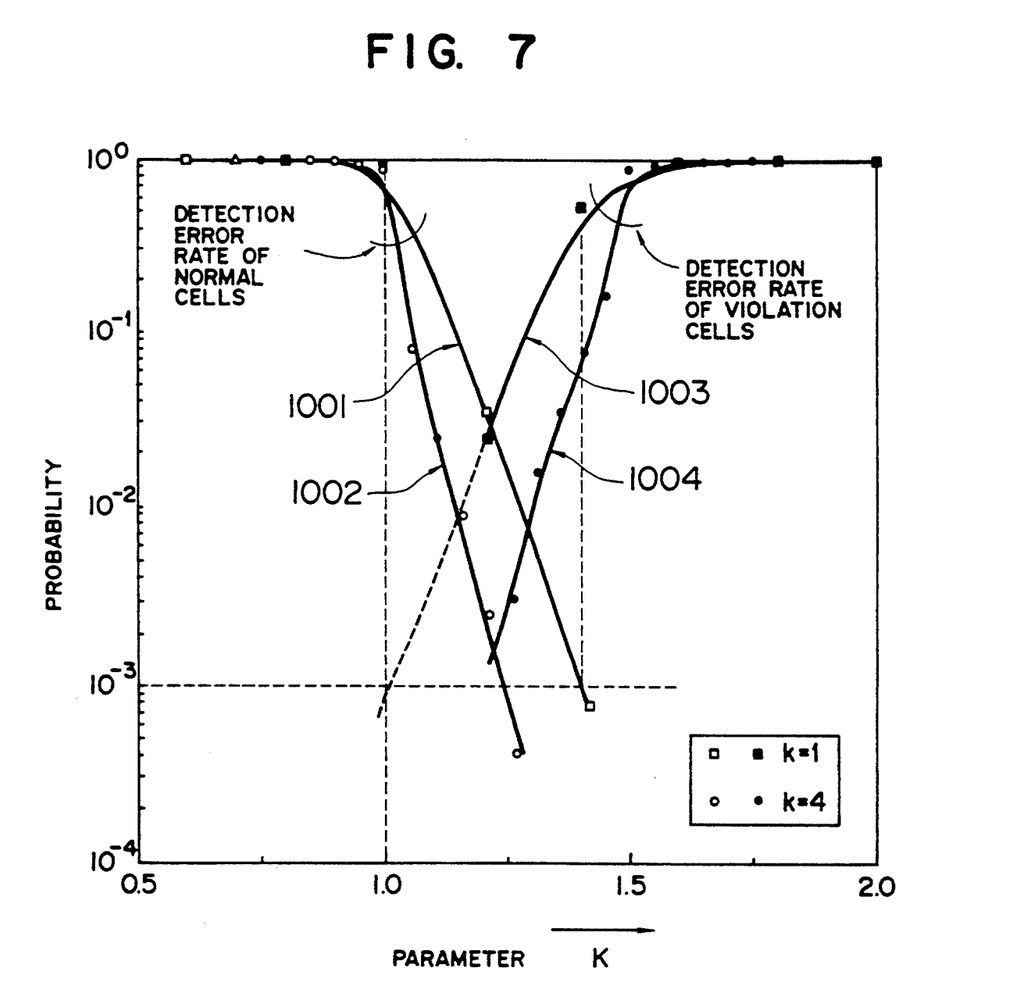
FIG. 7 is a graph showing the effects in an embodiment of the present invention.

FIG. 7 shows the effect of the parameters K and k. The abscissa denotes K and the ordinate denotes the detection error rates (probability) of violation and normal cells in the violation detection circuit 102 which is obtained by a computer simulation. Curves 1001 to 1002 denote the detection error rate of normal cells and curves 1003 to 1004 denote the detection error rate of violation cell.

The values of k which are adopted at this time are as follows:

$$k = 1 \ldots \text{(curves 1001, 1003)}$$

$$k = 4 \ldots \text{(curves 1002, 1004)}$$

In this embodiment, the number of the terminals which are accommodated by the multiplexer 2 is 80 and the average output line utilization is 0.8. It is assumed that the declared parameter be as $T = 150, X = 5$. It is assumed that most of the terminals (the number of normal terminals $= 72$) transmit cells at the maximum rate of 5 cells in the time interval $T = 150$ in accordance with the declared parameters and some of the terminals (the number of violation terminals $= 8$) transmit cells at the maximum rate of 7.5 cells in the time interval $T = 150$. Multiplexing is performed in FIFO (first-in-first-out) basis.

It is apparent from curves 1001 to 1002 that the detection error rate of normal cells is decreased as the value of K is increased. Accordingly, if it is requested that the detection error rate be suppressed not higher than $10^{-3}$, it suffices to preset $k = 1$, $k \geq 1.4$.

It is also apparent from curves 1003 to 1004 that the detection error rate of violation cells of $10^{-3}$ is decreased as the k is increased. Accordingly, if it is requested that the detection error rates of normal cells and violation cells be suppressed not larger than $10^{-3}$ and $5 \times 10^{-3}$, respectively, it suffices to preset $k = 4$, $K = 1.2$.

The detection error rates of normal and violation cells can be controlled to proper value by modifying the declared parameter from each terminal by the modification circuit 100 using parameters k and K even if fluctuation occurs in the multiplexer 2.

In FIG. 7, the detection error rates of normal and violation cells in case of $k = K = 1$ are those in the case if the declared parameter is not modified, i.e. the same detection error rates of normal and violation cells as prior art. In accordance with the prior art method, the detection error rate is as very high as $9 \times 10^{-1}$. Although the required detection error rate violation cells is as comparatively low as not higher than $5 \times 10^{-3}$, its value can not be controlled. Therefore, there is a problem that the request can be satisfied when a lower value is requested.

The values of the parameters k and K can be determined by following parameters (a) to (e) to the declared parameter modification circuit 100 from the control system 5.

(a) requested value of the detection error rate of normal cells;

(b) requested value of the detection error rate of violation cells;

(c) utilization of the output line 11;

(d) the number of subscriber terminal devices to be multiplexed;

(e) declared parameter (T/X)

The lower the detection error rate is requested, the higher the value of K should be preset. The lower the detection error rate is requested, the higher the value of k should be preset. The higher the line utilization and the number of multiplexings become or the lower the value of T/X becomes, the higher the value of k and K should be preset.

Therefore, it will suffice that on presetting of call, data representative of the above mentioned parameters (a) to (e) are inputted to the modification circuit 100 from the control system 5 and the modification circuit 100 outputs proper values of k and K depending upon the inputted data values to the arrival rate monitoring circuit 101 and the violation detection circuit 102.

Figure 4:
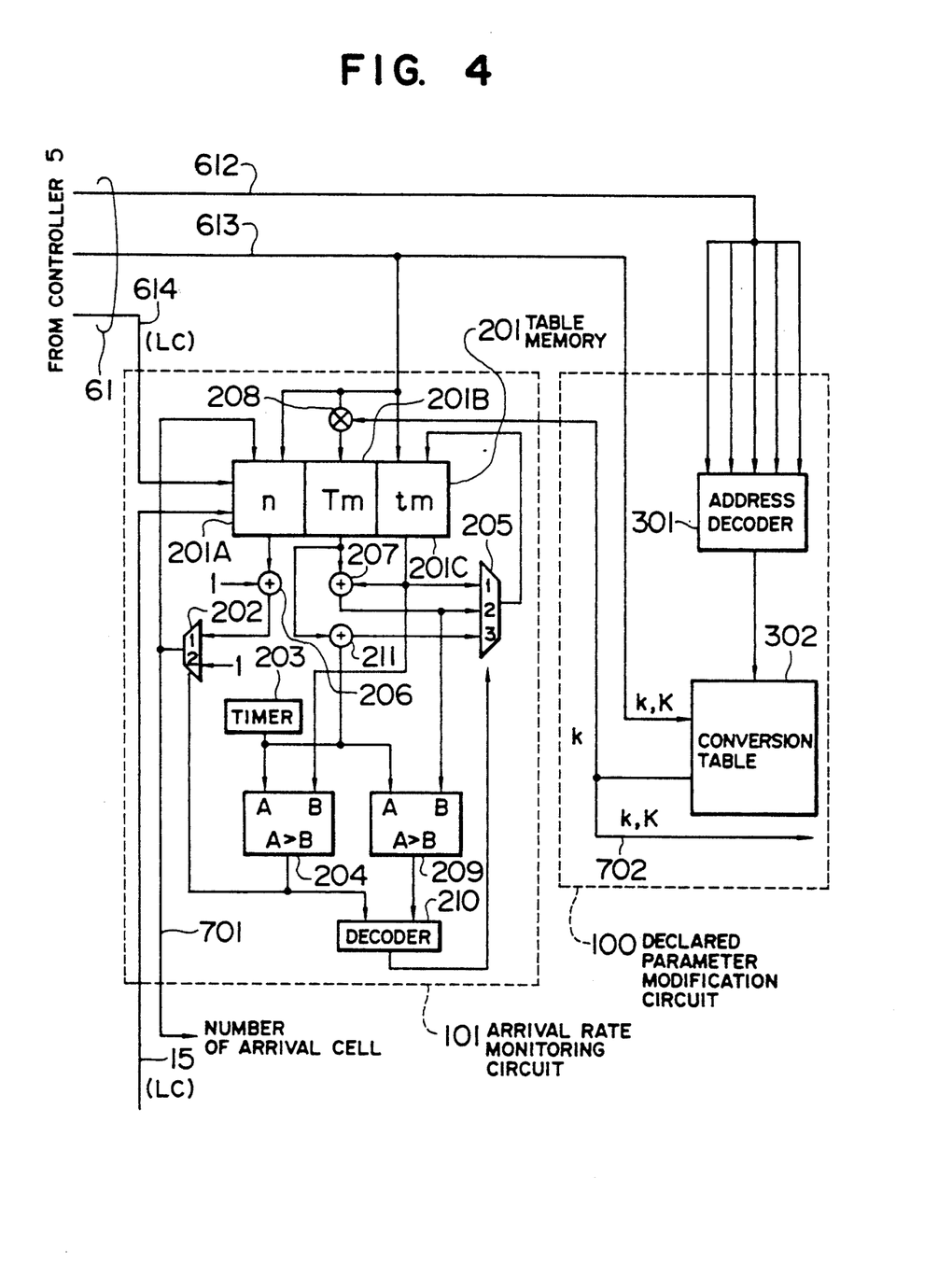
FIG. 4 is a block diagram showing a declared parameter modification circuit 100 and an arrival rate monitoring circuit 101 in FIG. 3.

The proper values of k and K may also be preliminarily determined by the computer simulation and may be stored in a conversion table 302 of the declared parameter modification circuit 100. On execution of the simulation, for example, multiplexing method, arrival characteristics of cells from the subscriber terminal to the multiplexer 2 is considered.

The number of subscriber terminal devices to be multiplexed is determined by the specification of the multiplexer 2 or the number of subscribers which call. The utilization of the output line 11 of the multiplexer 2 is predicted based upon the declared parameter of the subscribers who requested calls.

If, for example, 16 terminals declare T=100 and X=5, the output cells of these terminals are received by the multiplexer 2, the utilization of the output line 11 can be predicted as follows:

(The utilization of the output line 11) = $5/100 \times 16 = 0.8$

Since the declared parameter X is a maximum value, this predicted line utilization represents a maximum value. Accordingly, the utilization of the output line $11 \leq$ predicted line utilization.

Hence, the actual line utilization is momentarily changed on the condition that the predicted line utilization is a maximum value. For example, the actual average line utilization may be 0.7 even if the predicted line utilization is 0.8.

If the value K is determined based upon the predicted value when the difference between the predicted line utilization and the actual line utilization is large as described above, the value K will be a very safe preset value. Therefore, it is preferable that the value of the parameter K be modified to the maximum value. In the embodiment of the present invention, this modification is carried out by the feedback circuit 104.

Specifically, every time when a cell reaches the line 11 and determination which is larger, the packet arrival rate (n) or the threshold (Nth) is made by the violation detection circuit 102, the optimum value of K is outputted from the feedback circuit 104 for modifying the value of Nth (=X'=K.k.X).

Figure 8:
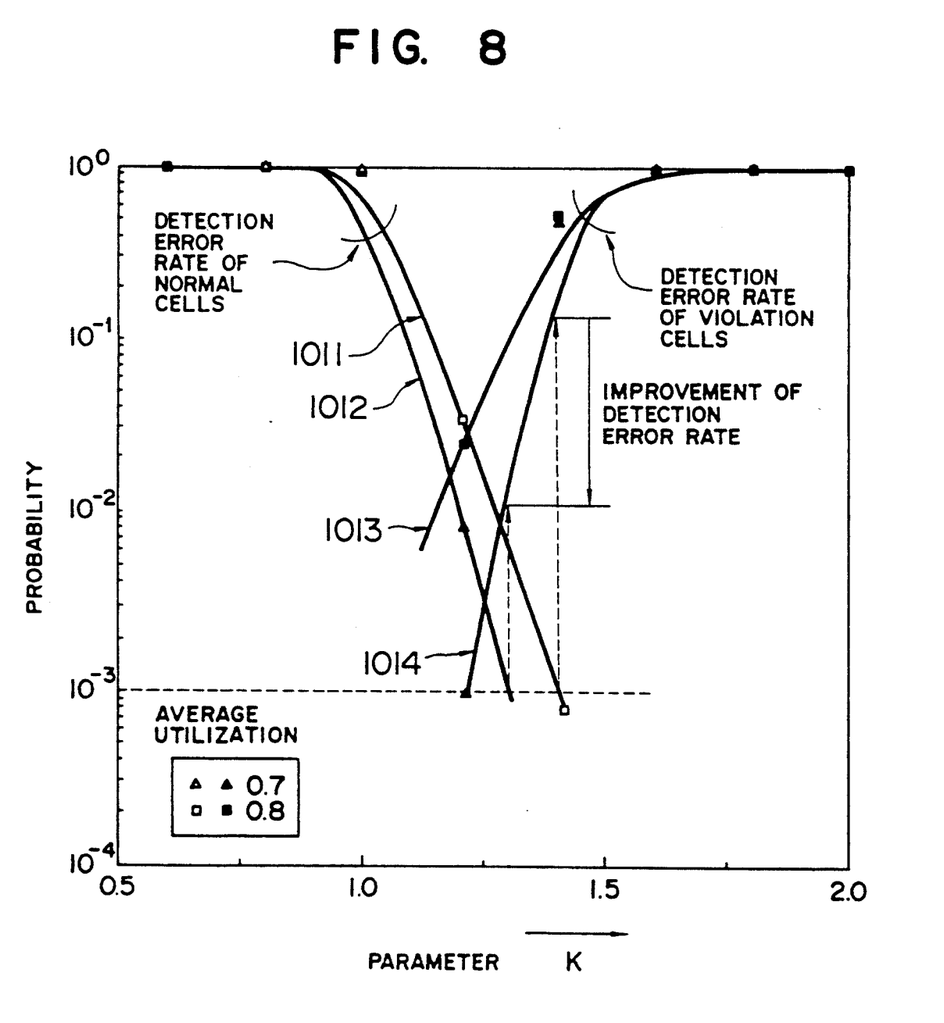
FIG. 8 is a graph showing the effects in another embodiment of the present invention.

FIG. 8 is a graph explaining the effect of optimization of the above mentioned value of K. The effect of the optimization resides in the reduction in the detection error of violation cells. Curves 1012 and 1014 represent the detection error rates of the normal and violation cells, respectively in case when the average utilization of the output line 11 is 0.7. Curves 1011 and 1012 represent the detection error rates of normal cells. Curves 1013 to 1014 represent the detection error rate of violation cells. The multiplexing method in this embodiment is FIFO type. The number of the multiplexed terminals, the number of normal terminals and the number of violation terminal are the same as those of FIG. 7. In this embodiment, k=1.

It is understood from curves 1011 and 1012 that the value of K for making the detection error rate not higher than $10^{-3}$ is not lower than 1.4 and 1.3 when the average line utilization is 0.8 and 0.7, respectively. Accordingly, if the actual line utilization which indicated by the monitoring circuit 103 is 0.7 even when the predicted line utilization is 0.8, it is not necessary in practice to preset K=1.4 in accordance with the predicted line utilization and the detection error rate of normal cells is suppressed not higher than $10^3$ even if K is preset 1.3. As is represented by curve 1014, by presetting K=1.3, the detection error rate of violation cells when the detection error rate of normal cells is $10^{-3}$ can be lowered to $10^{-2}$ from $1.5 \times 10^{-1}$ which is obtained when K=1.4.

The modified value of K can be determined by the following parameters.

(a) monitored value of line utilization;

(b) requested value of the detection error rate of normal cells;

(c) the number of subscriber terminal devices to be multiplexed;

(d) declared parameter (T/X);

(e) value of k

It is necessary to preset the higher K as the requested value of the detection error rate of normal cells becomes the lower. It is necessary to preset the higher K as the line utilization and the number of multiplexings become the higher, or values of T/X and k becomes the smaller.

Figure 5:
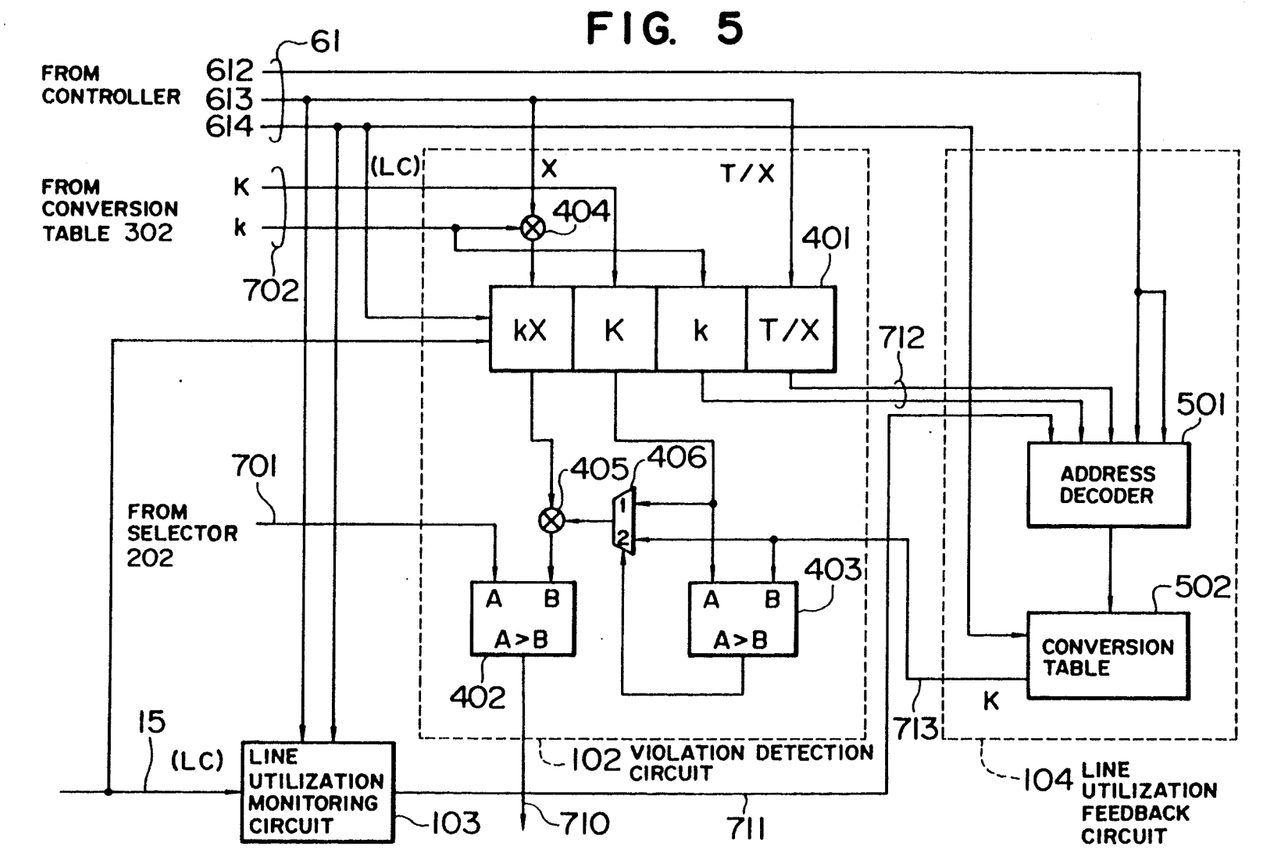
FIG. 5 is a block diagram showing a violation detection circuit 102 and a line utilization feedback circuit 104 of FIG. 3 in detail.

Therefore, as is shown in FIG. 5, information (a) is inputted to the feedback circuit 104 from the line utilization monitoring circuit 103 via the signal line 711 and the information (b) to (c) is inputted to the circuit 104 via a signal line 612 from the control system (call controller 5) and information (d) to (e) is inputted to the circuit 104 via a signal line 712 from the violation detection circuit 102.

The feedback circuit 104 modifies the value of K in accordance with the values of these parameters and applies the modified value of K to the violation detection circuit 102 via the signal line. The modified value of K may be preliminarily obtained by computer simulation, etc. and may be stored in the conversion table in the line utilization feedback circuit 104. On simulation, the multiplexing method and the arrival characteristics, etc. of cells from the subscriber terminal to the multiplexer are considered.

Operation of the cell arrival rate monitoring circuit 101 for monitoring the number of the cells which arrives within the time interval k.T (k=1,2,3,...) and the declared parameter modification circuit 100 for determining k and K will be described with reference to FIG. 4.

The arrival cell rate monitoring circuit 101 comprises a table memory 201, selector circuits 202 and 205, a multiplying circuit 208, adding circuits 206, 207 and 211, a timer 203, comparing circuits 204 and 209 and a decoder 210.

The memory 201 comprises a storage area 201A for storing the number of arrival cells, a storage area 201B for storing the monitoring time interval Tm and a storage area 201C for storing the initial preset time tm.

Since the arrival rate is monitored for each logical channel number LC in order to detect subscriber who violate the declared parameters, the parameters n, Tm and tm are managed for each logical channel number LC. Therefore, the parameters corresponding to the logical channel number LC are stored in the memory areas 201A to 201C which are addressed by the address LC of the table memory 201.

If the declared time interval is T, in order to monitor the number of cells which arrive within k.T, k.T is stored in the memory area 201B and the monitored value n which is stored in the memory area 201A is initially preset in every time interval k.T.

The time tm which is to be initially preset is stored in the memory area 201C and its value is updated at each interval k.T as follows:

tm (after updating) = tm (before updating) + Tm

Comparison between the current time and tm is made every time when a cell arrives. If a relation current time $\geq$ tm is established, updating of tm and initial presetting of n is performed. If this processing is performed only on arrival of cells, following relation may be established when the cell arrival rate is remarkably lower than Nth/Nm.

current time $\geq$ tm + Tm $\geq$ tm

In this case, updating of tm in accordance with tm (after updating) = tm (before updating) + Tm is of no use, it is better to update the value tm as follows:

tm (after updating) = current time + Tm

The "current time" is indicated by a timer 203 and comparison between the current time and tm is made by a comparator circuit 204 and comparison between "the current time" and "tm + Tm" is made by a comparator circuit 209. The results of the comparison are fed to the selecting circuit 205 via a decoder 210. A value of "tm + Tm" or "current time + Tm" is selected at the initial presetting time and tm is selected at the time other than the initial presetting time. The selected value is inputted to the memory area 201C.

Every time when a cell arrives at the input line 11, the memory 201 is accessed by addressing LC 914 which is read from the header 910 of the input cell. The number of arrival cells corresponding to the LC is read. The value n is changed to "n+1" and is written to the area 201A of the memory via the selecting circuit 202. Since the initial value "1" is selected by the selecting circuit 202 in response to an output signal from the comparator circuit 204 at the initial presetting time, the value "n" in the memory area 201A is changed to "1".

The value n of the number of the arrived cells which is outputted from the selecting circuit 202 is also inputted to the violation detecting circuit 102 shown in FIG. 5 via a signal line 701.

The values of the parameters Tm and tm and the initial value of n which are preset in the table memory are given via lines 61 (612, 613, 614) from the controller. When a call is preset in response to a request from a subscriber terminal, the controller 5 writes the initial value of the number of the arrival cells n and the arrival rate monitoring period of time Tm(T) and the monitoring start time tm in the table memory area corresponding to the logical channel number LC assigned to the call.

Designation of the logical channel number LC is performed via a signal line 614 by the controller 5. The value n, Tm and tm are inputted to the memory 201 via a data line 613. The initial values of the parameters n, Tm and tm which ar stored in the table memory at this time are 0, kT and 0, respectively. The value of the coefficient k of Tm is applied to a multiplier 208 via a signal line 702 from the declared parameter modification circuit 100 and the output kT of the multiplier 208 is inputted to the memory area 201B.

The method of determining the parameters k and K in the declared parameter modification circuit 100 shown in FIG. 2 will be described.

On presetting a call, values of following 5 parameters are inputted from the controller 5 to an address decoder 301.

(a) Requested detection error rate of normal cells;
(b) Requested detection error rate of violation cells;
(c) Predicated utilization of the output line 11;
(d) the number of subscriber terminal devices to be multiplexed; and
(e) declared parameter (T/X)

The address decoder 301 generates an address corresponding to the combination of the inputted values of the parameters (a) to (e). The conversion table 502 outputs to the signal line 702 the values of the parameters k and K stored in the memory area which is indicated by the generated address.

The values of the parameters k and K stored in the conversion table 302 can be determined, for example, as follows: Graphs showing the relations between the detection error rate of normal and violation cells and the values of K as shown in FIG. 7 which correspond to the values of the parameters (c) to (e) are preliminarily provided and the values k and K are determined from the requested values of the parameters (a) and (b) and the graph. The determined values of k and K are given to the conversion table 302 via a data line 613 and are written in the memory location which is designated by an address which the address decoder 301 will determine in accordance with the values (a) to (e).

Preparation of the graphs and determination of the values k and K can be carried out by simulation or theoretical analysis by a computer which is different from the data processor 51 of the switching system. It is not necessary for the controller 5 in the switch system to perform complicated computation for determining the values k and K on acceptance of a call. On execution of the simulation or theoretical analysis, the method of multiplexing and the arrival characteristics of cells from the subscriber terminal to the multiplexer are assumed.

Now, operation of the violation detection circuit 102 and the line utilization feedback circuit 104 will be described with reference to FIG. 5.

The violation detection circuit 102 has capabilities of comparing the number of cells n arrived within the time interval Tm with the threshold Nth=K.k.X every arrival of cells and of detecting the violation cells. The violation detection circuit 102 comprises a memory 401, comparator circuits 404 and 403 and multiplexes 404 and 405 and a selecting circuit 406.

The comparator circuit 402 compares the number of arrival cells n inputted via the signal line 701, which is monitored by the arrival cell rate monitoring circuit 101 with the threshold Nth =K.k.X of the number of arrival cells every time when cells arrive and determines that the arrival cells are violation cells when the relation n≦Nth is established and outputs a cell regulation signal to the signal line 710.

Values of the parameters k.X and K for each LC are stored in the memory 401. Every time when a cell arrives at the input line 11, the values of the parameters k.X and K corresponding to LC which the header of the cell indicates are read from the memory 401.

At this time, the modified value of K is outputted to the signal line 713 from the line utilization feedback circuit 104. The selecting circuit 406 selects smaller one of Ks which have been read from the memory 401 and the line utilization feedback circuit 104. This aims at reduction in the detection error rate of violation cells as is described with reference to FIG. 8.

The multiplier 405 multiplies the value of k.X read from the memory 401 by the value of K outputted from the selecting circuit 406 for generating the threshold Nth=K.k.X. The comparator circuit 402 compares the value of n with the value of the Nth for generating the cell regulation signal depending upon the result. The comparator circuit 403 compares the value of K outputted from the memory 401 with the value of K outputted from the line utilization feedback circuit 10 to control the selecting circuit 406 depending upon the result of the comparison.

The memory 401 has an area 402C for storing the value k and an area 402D for storing the value of the declared parameter T/X in addition to an area 401A for storing the parameter k.X and an area 402B for storing K so that they correspond to each LC. The values of the parameters k and T/X are read every time when a cell arrives, they are inputted to the feedback circuit 104 via the signal line 713 for determining the modified value of K. The values of T and X stored in the memory 401 are inputted (to the circuit 104) via the signal line 613 from the controller 5 on presetting of a call. The values of the parameters k and K inputted (to the circuit 104) via the signal line 702 from the declared parameter modification circuit 100.

The multiplier 404 inputs to the memory area 401A input the product kX of the value of k inputted from the declared parameter modification circuit 100 and the value of X inputted from the controller 5.

The line utilization feedback circuit 104 comprises the address decoder 501 and the conversion table 502. The following values are inputted to the address decoder 501.

(a) utilization of the output line 110;
(b) the number of subscriber terminal devices to be multiplexed by the multiplexer 2;
(c) requested value of the detection error rate of normal cells;
(d) k which is given to LC to which the arrival cell belongs; and
(e) the declared parameter T/X (=T+X) of LC to which the arrival cell belongs The parameter (a) among these parameters is inputted to the address decoder 501 via a signal line 711 from the line utilization monitoring circuit 103 and the parameters (b) and (c) are inputted to the decoder 501 from the controller 5 via a signal line 612. The parameters (d) and (e) are inputted to the decoder 501 from the violation detection circuit 102 via a signal line 712 every time when a cell arrives.

The address decoder 501 outputs an address for accessing to the conversion table 502, which is determined depending upon the combination of the values of the inputted parameters (a) to (e). The conversion table 502 outputs to the signal line 713 the value of K stored in the area which is addressed by the address.

A method of determining the value of the parameter K stored in the conversion table 502 will now be described.

Graph showing the relation between the value of K and the detection error rates of normal and violation cells as shown in FIG. 8, which correspond to the values of the parameters (a), (b), (c) and (e) are provided. The value of the parameter K is determined from these graphs and the requested value (c) of the detection error rate of normal cells The determined value of K is stored in the storage area in the table 502, which is addressed by an address which the address decoder 501 determines in accordance with the parameters (a) to (e).

Preparation of these graphs and determination of the value of K may be achieved by simulation or theoretical analysis by a computer different from the switching system. This will eliminate the necessity to perform complicated computation for determining the values of k and K by the controller 5 of the switching system on acceptance of a call. On execution of simulation or theoretical analysis, the method of multiplexing and the cell arrival characteristics form the subscriber terminal to the multiplexer, etc. are assumed.

Figure 6:
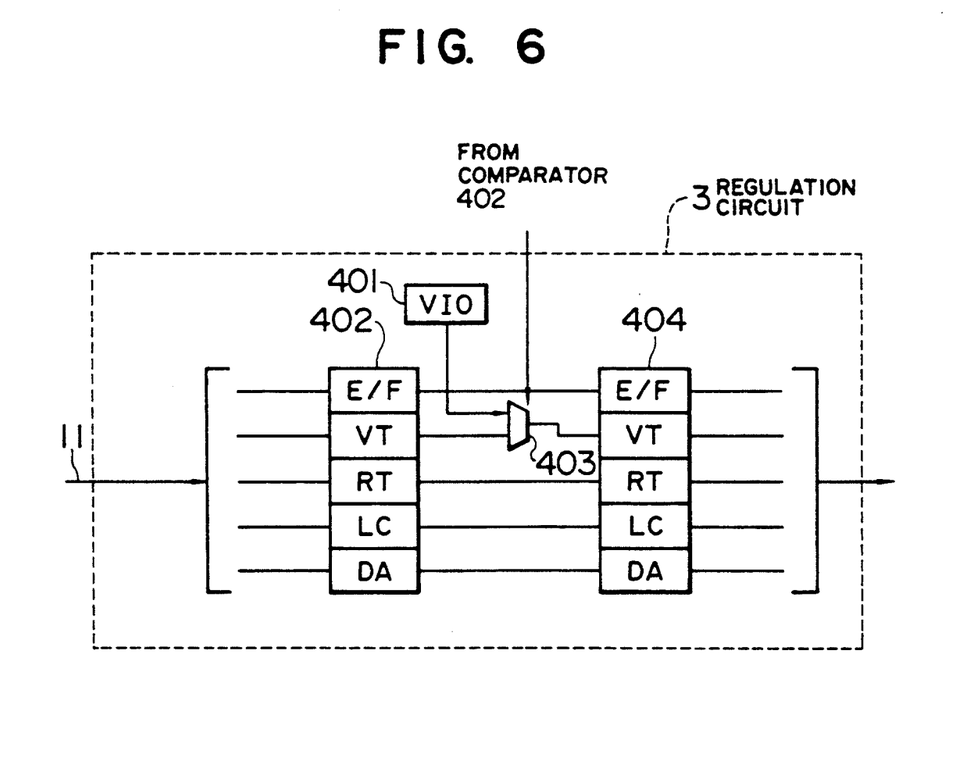
FIG. 6 is a block diagram showing a regulation circuit 3 of FIG. 3 in detail.

Operation of the packet regulation circuit 3 will be described with reference to FIG. 6.

The packet regulation circuit 3 adds an input cell with a given identification mark representing that the inputted cell is a violation cell if the violation detection circuit 102 detects that the input cell is a violation cell.

The packet regulation circuit 3 comprises registers 402 and 404 for temporarily storing cells, a register for storing a bit pattern representative of a violation identification mark and a selecting circuit 403.

When the violation detection circuit 102 outputs the cell regulation signal, the selecting circuit 403 selects the output signal from a register 401 and changes the bit pattern of the violation cell indicating field VT of the inputted cell into a pattern (mark) representing the violation The cell which is added with the mark (marked cell) is treated as a non-priority cell in the switching system and will be discarded in the priority control circuit 41 when congestion occurs in the ATM network so that cells should become to be disposed.

Processing the marked cell in such a manner prevents the communication quality of normal cells from deteriorating, which may otherwise occur due to influence of violation cells when congestion occurs.

As is understood from the foregoing description, since the multiplexer is disposed between terminals and a ATM network in accordance with the present invention, the declared parameter of the packet rate is automatically modified depending upon the utilization condition of the multiplexer even if a change in packet interval occurs. Accordingly, the detection error rate of the violation cells and the detection error rate of the normal cells can be reduced so that the quality of communication of normal packet cells can be assured. Particularly, if the system is configured so that the declaration parameter modification circuit is controlled in accordance with the output line utilization of the multiplexer, effective rate monitoring can be performed in response to momentary change in packet arrival rate which can not be predicted from only the number of subscribers which request calls and the declared parameters of the subscribers.

We claim:

1. A method of monitoring the packet rate by a monitoring system at the entrance to a packet network, said monitoring system being connected with a communication line to which a plurality of subscriber terminal devices are coupled through a connecting apparatus which fluctuates the interval of packets on a communication path between the subscriber terminal devices and the packet network, said method comprising the steps of:

presenting to a controller of the packet network from each of said subscriber terminal devices declared parameters representative of the packet rate in communication, which will be performed by the subscriber terminal device, on request of call connection for a call;

determining by said controller of said packet network which accepts the request of the call connection whether transmission of the call from the subscriber terminal device is permissive based upon utilization condition of the packet network and the declared parameters;

permitting a subscriber terminal device, by said controller, to transmit packets within a range of said declared parameters;

automatically modifying at least one of the declared parameters depending upon at least one of a status of said connecting apparatus and a transmission status of packets on the communication path between the subscriber terminal devices and the packet network monitored by said monitoring system;

transmitting packets from the subscriber terminal device; and monitoring by said monitoring system at the entrance to the packet network based upon the modified declared parameters whether or not transmission of excessive packets which violates the modified declared parameters is carried out.

2. A method of monitoring the packet rate according to claim 1, further comprising the steps of:

adding a predetermined mark indicating a violation packet to an excessive packet which is detected by said monitoring system and accepting the marked packet into said packet network; and discarding the marked packets when congestion of packets occurs in the packet network.

3. A packet communication network system comprising:

a plurality of subscriber terminal devices for communicating with each other by packets, each subscriber terminal device presenting on a call request for a call to a packet network declared parameters representative of the packet rate in the call;

multiplexing means for multiplexing packets transmitted form a group of subscriber terminal devices to one of a plurality of transmission lines connected to the packet network;

control means for determining based upon available communication capacity of the packet network and the declared parameters presented by each of the subscriber terminal devices whether the call request is acceptable and for permitting the subscriber terminal device to transmit packets within a range of the declared parameters if the call request is acceptable; and network terminating means connected to the transmission lines on which a plurality of packets are multiplexed by said multiplexing means;

said network terminating means including:

means for automatically modifying the declared parameters presented from said subscriber terminal devices depending upon at least one of a status of said multiplexing means and a transmission status of packets on the transmission lines between said multiplexer means and said network terminating means, and means for detecting violation packets among the packets on the transmission lines based upon the modified declared parameters.

4. A packet communication network according to claim 3, wherein the network terminating means further includes means for adding a predetermined mark to each of the violation packets detected by said monitoring means and for taking the marked packets into the packet network on a premise that the marked packets may be discarded according to needs in the packet network.

5. A packet communication network according to claim 4, wherein each of said terminal devices presents the declared parameters as the maximum quantity of the packets transmitted in unit time; and said automatically modifying means modifies at least one of parameters representative of the unit time and maximum quantity of the transmitted packet, respectively.

6. A packet communication network according to claim 4, wherein said automatically modifying means modifies the declared parameters from the subscriber terminal devices depending upon the number of said group of subscriber terminal devices accommodated in said multiplexing means and utilization of the transmission lines of connected to the multiplexing means.

7. A packet communication network according to claim 3, wherein each subscriber terminal device presents the declared parameters as the maximum quantity of packets transmitted in unit time; and said automatically modifying means modifies at least one of parameters representative of the unit time and the maximum quantity of the transmitted packet, respectively.

8. A packet communication network according to claim 7, wherein said automatically modifying means modifies the declared parameters from the subscriber terminal devices depending upon the number of said group of subscriber terminal devices accommodated in said multiplexing means and utilization of the transmission lines of connected to the multiplexing means.

9. A packet communication network according to claim 3, wherein said automatically modifying means modifies the declared parameters from the subscriber terminal devices depending upon the number of said group of subscriber terminal devices accommodated in said multiplexing means and utilization of the transmission lines connected to the multiplexing means.

10. A method of monitoring the packet rate in a packet communication network in which each of subscriber terminal devices which are connected with the packet network via a multiplexing unit declares parameters representative of the maximum number of packets to be transmitted in unit time for each logical channel number and the packet network determines based upon the declared parameters whether or not a call request is permitted and detects the packets which violate the declared parameters for each permitted call, comprising the steps of:

modifying at least one of said parameters which are declared by the subscriber terminal devices in accordance with at least one of the number of subscriber terminal devices accommodated in said multiplexing unit and output line utilization thereof; and detecting the violation of the declared parameters by comparing the number of packets for each logical channel number arrived at the packet network through said multiplexing unit with a permissive number of the packets calculated from the modified parameters.

11. A method of monitoring the packet rate according to claim 10, wherein at least one of the values of the declared unit time and the declared maximum number of packets are modified in accordance with the number of subscriber terminal devices accommodated in said multiplexing unit, the output line utilization of the multiplexing unit, and the allowable detection error rate of normal and violation packets.

12. A method of monitoring communication packets transmitted to a packet network from terminal devices by a monitoring unit connected at the entrance to the packet network, said method comprising the steps of:

permitting a terminal device, which is connected to the packet network through a connecting apparatus which varies the interval of packets to be relayed to a transmission line toward the packet network, to transmit packets within a predetermined transmission rate determined in accordance with declared parameters which are declared by the terminal devices to the packet network when the terminal devices request a call connection;

modifying at least one of the declare parameters depending upon the status of said connecting apparatus, the modified parameters being stored in the monitoring unit connected to the transmission line so as to detect transmission rate of communication packets on the transmission line for each terminal device;

transmitting communication packets from the terminal device to the packet network through said connecting apparatus; and detecting by said monitoring unit, excessive packets transmitted in violation of the transmission rate permitted to the terminal device by comparing the monitored transmission rate and a transmission rate obtained from the modified parameters.

13. A method of monitoring communication packet according to claim 12, wherein at least one of said declared parameters is modified depending upon the status of the utilization of the transmission line between the connecting apparatus and the packet network.

14. A method of monitoring communication packet according to claim 12, further comprising the steps of:

adding by said monitoring unit, a predetermined mark indicating a violation packet to the excessive packets detected in said monitoring step and accepting the marked packets in the packet network on a premise that the marked packets are discarded if congestion of packets occurs in the packet network.

15. A packet communication network system comprising:

a plurality of terminal devices each of which presents on call request for a call to a packet network declared parameters representative of the packet rate in the call;

multiplexing means for multiplexing packets transmitted from a group of terminal devices to one of transmission lines connected to the packet network;

control means for permitting each of said terminal devices to transmit packets within a range of the declared parameters when a call is requested from the terminal devices after determining based upon available communication capacity of the packet network and the declared parameters presented by the terminal device whether the call request is acceptable or not; and network terminating means connected to the transmission line to which the output of said multiplexing means is delivered;

said network terminating means including:

means for modifying the declared parameters presented from said terminal devices depending upon at least one of a status of said multiplexing means and a status of utilization of the transmission line between the multiplexer means and the network terminating means, and means for detecting violation packets among the packets on the transmission line based upon the modified declared parameters.

16. A packet communication network according to claim 15, wherein said network terminating means includes means for adding a predetermined mark to each of the violation packets detected by said monitoring means and for taking the marked packets into the packet network on a premise that the marked packets are discarded if congestion of packets occurs in the packet network.

* * * * *